US007193982B2

(12) United States Patent
Frerking et al.

(10) Patent No.: US 7,193,982 B2
(45) Date of Patent: Mar. 20, 2007

(54) SYSTEM AND METHOD FOR PROVIDING FLEXIBLE DATA RATE TRANSMISSION IN A TELECOMMUNICATION SYSTEM

(75) Inventors: Melvin D. Frerking, Norcross, GA (US); Alain Ohana, Aventura, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 980 days.

(21) Appl. No.: 10/044,386

(22) Filed: Jan. 11, 2002

(65) Prior Publication Data

US 2003/0156564 A1   Aug. 21, 2003

(51) Int. Cl.
*H04B 7/216* (2006.01)
(52) U.S. Cl. ........................ 370/335; 370/401
(58) Field of Classification Search ................ 370/328, 370/335, 338, 342, 401, 336
See application file for complete search history.

(56) References Cited

U.S. PATENT DOCUMENTS

| | | | | |
|---|---|---|---|---|
| 5,923,651 A * | 7/1999 | Struhsaker | .................. | 370/342 |
| 6,173,006 B1 * | 1/2001 | Kent et al. | ................... | 375/145 |
| 6,320,851 B1 * | 11/2001 | Kim et al. | ................... | 370/320 |
| 6,539,047 B1 * | 3/2003 | Moon | ......................... | 375/135 |
| 6,650,688 B1 * | 11/2003 | Acharya et al. | ............ | 375/141 |
| 6,697,629 B1 * | 2/2004 | Grilli et al. | .............. | 455/456.1 |
| 6,847,622 B1 * | 1/2005 | Emmons et al. | ........... | 370/335 |
| 6,965,633 B2 * | 11/2005 | Sun et al. | ................... | 375/145 |
| 2003/0031147 A1 * | 2/2003 | Zeira et al. | ................. | 370/337 |

* cited by examiner

*Primary Examiner*—Huy D. Vu
*Assistant Examiner*—Christine Ng
(74) *Attorney, Agent, or Firm*—Parks Knowlton LLC; Paul E. Knowlton, Esq.; Coulter Henry

(57) ABSTRACT

A base station for providing flexible data rate transmission in a telecommunications system. The base station comprises an interface coupled to a signal processor coupled to a transmitter. The interface receives an incoming data stream. The signal processor receives the incoming data stream from the receiver and selects an operating downlink chip rate from at least two chip rates. The signal processor selects a spreading factor and spreads the incoming data stream into a spread data stream with a channelization code. The transmitter, receives the spread data stream from the signal processor and transmits the spread data stream over an air interface.

37 Claims, 8 Drawing Sheets

SYSTEM AND METHOD FOR PROVIDING FLEXIBLE DATA RATE TRANSMISSION IN A TELECOMMUNICATION SYSTEM

TECHNICAL FIELD

This invention relates to the field of mobile telecommunications, and more specifically, a system for and method of providing flexible data rate transmission systems in a mobile communications network.

BACKGROUND

We are entering an era of transition in mobile wireless networks from second generation systems (2G systems) to third generations systems (3G systems). There is a large installed base of 2G systems throughout the world, including GSM (Global System for Mobile Communication). 3G systems include an array of proposed standards, two of which include CDMA2000 and UMTS (Universal Mobile Telecommunications System). 3G systems offer a host of advantages over 2G systems, at least in part because 3G systems are designed to handle the every increasing variety of traffic types that user's access over the air. Whereas 2G systems were designed with voice traffic as the primary type of traffic, 3G systems were designed with data traffic as a primary traffic type.

This evolution of wireless thought can best be seen by the data rates at which 2G and 3G systems typically operate. Current GSM can typically deliver speeds of 10–50 kbits/second and utilize TDMA (time division multiplex access) over channels of, for example, 200 kHz in bandwidth. 3G systems are designed to deliver much higher data transmission speeds over correspondingly wider bandwidths. For example, UMTS may deliver at data transmission speeds over 2 Mbits/second utilizing CDMA (code division multiple access) on channels of 5 MHz bandwidth.

A UMTS may be broken up into two portions: the core network and the radio network. The radio network of a UMTS is typically called the UMTS Terrestrial Radio Access Network (UTRAN) system. In UTRAN, communication may take place between a handset or remote terminal (more generally referred to as an example of user equipment or UE) and a base station (NodeB) utilizing a Frequency Division Duplex (FDD) mode communicating using CDMA. In FDD mode, separate channels are used for uplink and downlink of information. As defined by UMTS standards, transmission of data occurs within a 10 ms radio frame. The radio frame is divided into 15 slots, with each slot consisting of 2560 chips per slot. Multiplying the number of chips per slot by the number of slots within the 10 ms. radio frame yields a chip rate of 3.84 Mchips/second.

A "chip" is a unit of information transmitted over a spread spectrum system (such as CDMA) after a spreading code has been applied to the incoming bit stream. In order to spread an incoming bit stream, the incoming bit stream is multiplied by a spreading code having a greater bit rate, with the greater bit rate being based on the spreading factor. The spreading code in the UMTS standard is actually comprised of two different codes: a channelization code and a scrambling code. The incoming bit stream is first multiplied by the channelization code, with the resulting product multiplied by the scrambling code. The channelization code, also known as Walsh code, is used in the downlink direction to uniquely identify the UE to which the data is being delivered. While in the uplink direction, the channelization code is used to distinguish data and control channels from the same UE. The scrambling code or spreading code is used in the downlink direction to separate cells, and in the uplink direction, the scrambling code is used to identify the UE from which the signal originates.

In UMTS, scrambling codes are typically selected to be of the same length as a frame, e.g., 38,400 chips in UTRAN, and are selected from an even longer pseudo-random sequence. Channelization codes are variable length codes, where the code length is based on the spreading factor selected for the transmission. Spreading factors vary from 4 to 512 in the downlink direction and from 4 to 256 in the uplink direction. Since the length of the channelization code is based on the spreading factor, the number of chips produced for each incoming bit is directly related to the spreading factor. For instance, a UTRAN system using a spreading factor of 4 would produce 4 chips per incoming bit. While the spreading factor may vary, the chip rate remains at 3.84 Mchips/second in the UTRAN standard. A more detailed description of UMTS networks can be found in *UMTS Networks: Architecture, Mobility and Services*, by Heikki Kaaranen, et al., John Wiley & Sons, 2001.

Clearly, it is a daunting task for a network provider to migrate from existing 2G systems to 3G systems, such as UMTS. During this period of change, mobile network providers are faced with the problem of migrating their networks and users from 2G systems to 3G systems. These problems include, for example, allocated spectrum bandwidth constraints and high startup costs to rapidly transition from 2G systems to 3G system.

For example, current network providers often have limited allocated spectrum bandwidth from the government. It is typical for a network provider to only be allocated 30, 20, or as little as 10 MHz in a particular market. When migrating from a 2G system to a 3G system, this lack of available bandwidth may be a significant constraint. It is unlikely that a network provider can set aside the 10 MHz necessary (5 MHz transmit frequency+5 MHz receive frequency) to deploy a single channel in a UMTS without partially abandoning their installed base of clients due to the tremendous band amount of bandwidth currently required to startup a 3G system, such as UMTS. In a sense, this is a granularity or step-size problem. A network provider can not gradually step into a 3G system as currently specified, but must jump in with both feet.

Tremendous initial startup costs also plague the transition from 2G to 3G systems. Because of the bandwidth requirements of 3G systems, such as UMTS, the 3G systems will crowd out the 2G systems from the allocated spectrum bandwidth of a network provider. This forces the network provider to make a wholesale switch from 2G to 3G networks, which entails tremendous initial startup costs to the network provider.

The present invention is directed to overcoming the one or more problems associated with transitioning of systems from second generation to third generation by providing a flexible data rate transmission in a telecommunications system that allows the gradual transitioning of systems by providing a flexible bandwidth that can be gradually increased during the transitioning.

SUMMARY OF THE INVENTION

In accordance with an aspect of the present invention, a base station for providing flexible data rate transmission in a telecommunications system is disclosed. The base station comprises an interface coupled to a signal processor coupled to a transmitter. The interface receives an incoming data stream. The signal processor receives the incoming data stream from the receiver and selects an operating downlink chip rate from at least two chip rates. The signal processor selects a spreading factor and spreads the incoming data stream into a spread data stream with a channelization code. The transmitter receives the spread data stream from the signal processor and transmits the spread data stream over an air interface.

In accordance with another aspect of the present invention, a method of providing flexible data rate transmission in a telecommunication system is disclosed. The method comprises receiving an incoming bit stream and selecting an operating chip rate from at least two chip rates. Next, the method selects a spreading factor and spreads the incoming data stream into a spread data stream with a channelization code.

In another aspect of the present invention, a user equipment for providing flexible data rate transmission in a telecommunications system is disclosed. The base station comprises an interface coupled to a signal processor coupled to a transmitter. The interface receives an incoming data stream. The signal processor receives the incoming data stream from the receiver and selects an operating uplink chip rate from at least two chip rates. The signal processor selects a spreading factor and spreads the incoming data stream into a spread data stream with a channelization code. The transmitter receives the spread data stream from the signal processor and transmits the spread data stream over an air interface.

In another aspect of the present invention, a computer-readable medium having executable instructions for performing steps that provide flexible data rate transmission in a telecommunication system is disclosed. The instructions are for receiving an incoming bit stream and selecting an operating chip rate from at least two chip rates. Next, the instructions are for selecting a spreading factor and spreading the incoming data stream into a spread data stream with a channelization code.

In accordance with another aspect of the present invention, a signal processor for providing flexible data rate transmission in a telecommunications system is disclosed. A processor within the signal processor receives an incoming data stream and selects an operating downlink chip rate from at least two chip rates. The processor selects a spreading factor and spreads the incoming data stream into a spread data stream with a channelization code.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing summary and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Embodiments of the present invention are designed to operate in any spread spectrum application, particularly where a low chip rate application is intended to be replaced with a high chip rate application. For instance, embodiments of the present invention may be used where a 3G network is going to be replacing or supplementing a 2G or 2.5G network. An exemplary embodiment of the present invention will be presented as embodied in a modified UMTS application. For purposes of clarity, the prior art UMTS or UTRAN system will be termed Full Rate UMTS or Full Rate UTRAN to denote that the prior art system will only operate at the prescribed 3.84 Mchips/second chip rate. The exemplary embodiment of the present invention will be denoted as Reduced Rate UMTS or Reduced Rate UTRAN.

Figure 1:
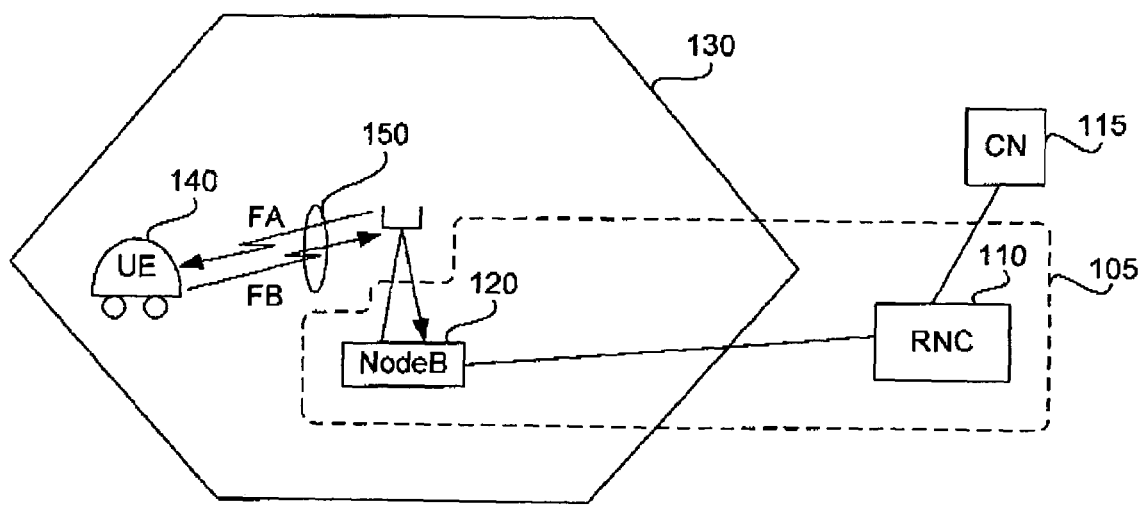
FIG. 1 illustrates a diagram of a Reduced Rate UTRAN system in an exemplary embodiment consistent with the present invention.

FIG. 1 illustrates a diagram of a Reduced Rate UTRAN system in an exemplary embodiment consistent with the present invention. The UTRAN implements embodiments of the present invention in its radio network subsystem 105 that comprises at least one Radio Network Controller (RNC) 110 in communication, over what is termed the Iub interface, with at least one base station (NodeB) 120.

The RNC 110 may be responsible for Layer 2 and Layer 3 functions, such as Radio Resource Control (RRC), Radio Link Control (RLC) and Medium Access Control (MAC). A full explanation of the operation of these layers and functions can be found in the previously noted Kaaranen reference. The RNC 110 communicates with the Core Network (CN) 115 over what is termed the Iu interface. The CN 115 provides support for network features and telecommunications services.

The NodeB 120 is typically responsible for Layer 1 or physical layer (PHY), which includes coding and modulation, and communicates with the User Equipment (UE) 140 in a cell 130. In general, user equipment includes mobile handsets, mobile terminals, and other equipment which contains transceivers for communicating across a mobile network. A frequency duplexed data channel is illustrated as Dedicated Channel (DCH) 150 communicating between the UE 140 and the NodeB 120 over what is termed the Uu interface.

Figure 2:
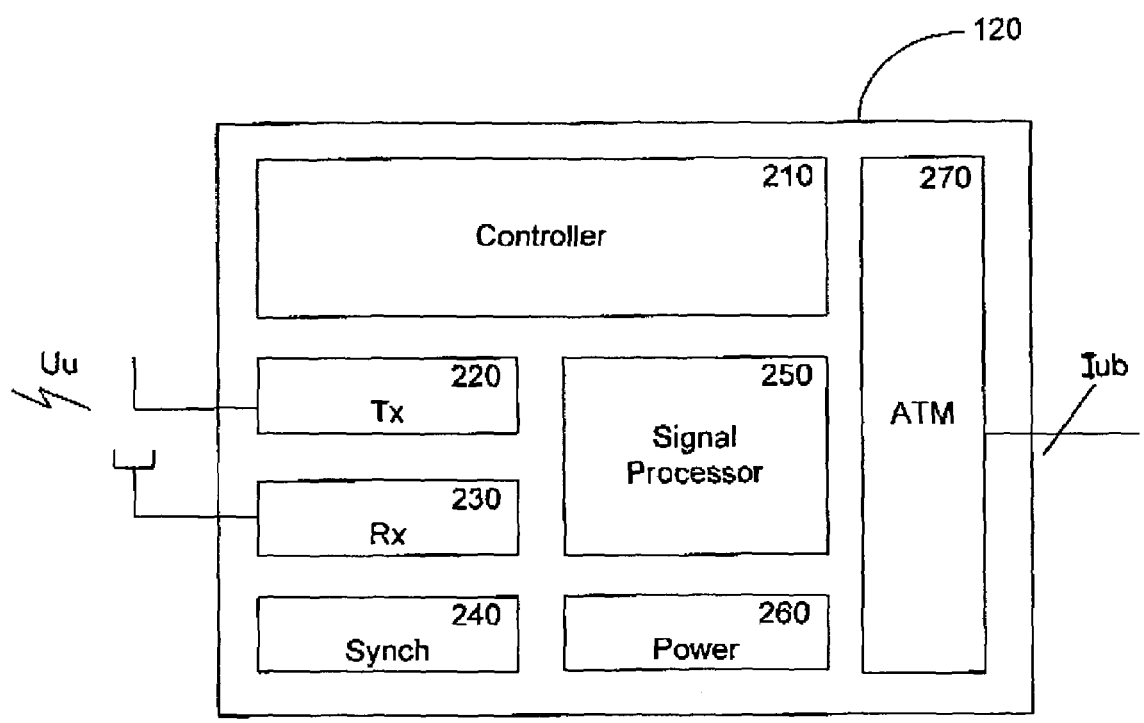
FIG. 2 illustrates a diagram of a typical NodeB in an exemplary embodiment consistent with the present invention.

FIG. 2 illustrates a diagram of a typical NodeB 120 in an exemplary embodiment consistent with the present invention. The NodeB 120 comprises a number of functional blocks that communicate with each other as necessary to perform their designated functional roles. The blocks illustrated in FIG. 2 may be implemented in a variety of hardware, both analog and digital, and software aspects, known to those skilled in the art. Asynchronous Transfer Module (ATM) 270 interfaces the NodeB 120 with the RNC in ATM mode over the Iub interface. Power is supplied to the components of the NodeB 120 by Power Supply 260.

The Controller 210 may operate in conjunction with the ATM 270, Signal Processor 250, Transmitter 220, Receiver 230, and Synchronization module 240 to effectuate operation of the NodeB to serve as the physical interface from the RNC to the UE. An interface, ATM 270, receives a downlink input data stream over the Iub interface from the RNC and transmits an uplink output data stream over the Iub interface to the RNC. Coupled to the ATM 270, The Signal Processor 250, comprising an input, processor, and output, may be operable to generate the channelization codes and scrambling codes, perform spreading and dispreading operations, interleaving and deinterleaving, and other functions associated with forming the physical layer operability. Signal Processor 250 is in communication with the Transmitter 220, which operates to generate the carrier, modulate and transmit the resulting signal, and with the Receiver 230, which operates to demodulate a received signal. The Synchronization module 240 is in communication with the Transmitter 220, the Signal Processor 250, and the Controller 210 and is responsible for sending synchronization signals to the UE over a synchronization channel (SCH), so that the UE can find and properly communicate with the NodeB 120 and learn the appropriate downlink operating chip rate.

Figure 3:
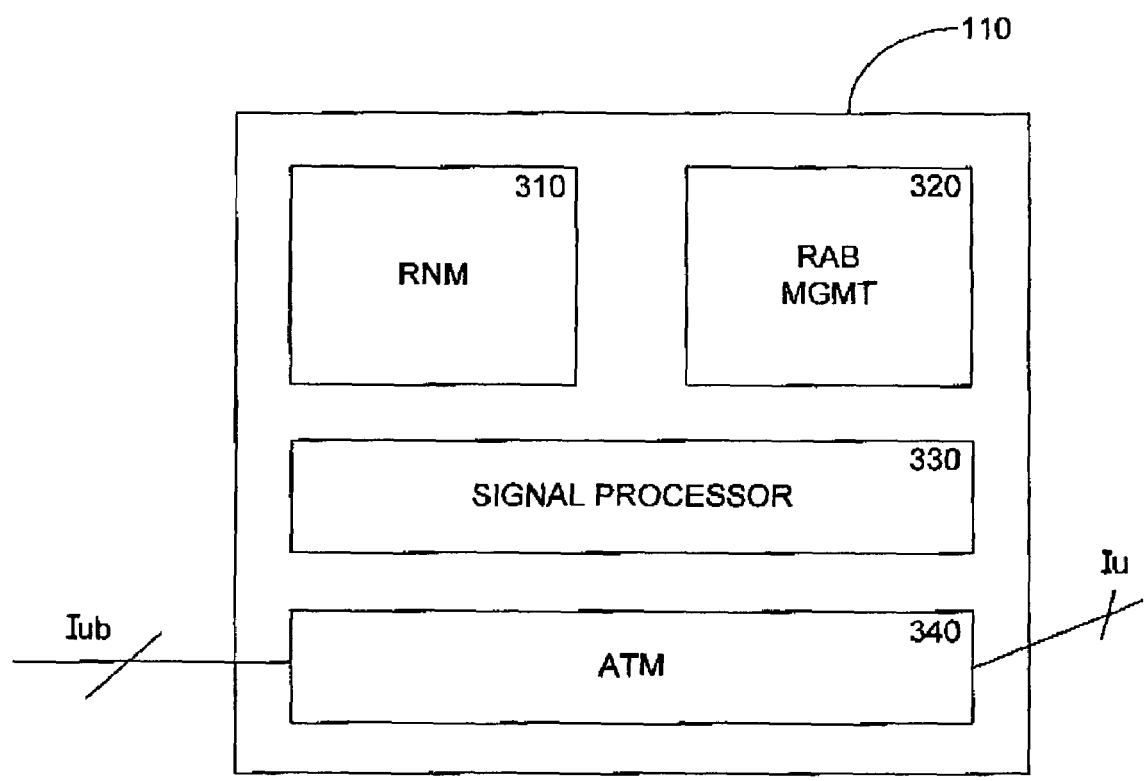
FIG. 3 illustrates a diagram of a typical RNC in an exemplary embodiment consistent with the present invention.

FIG. 3 illustrates a diagram of a typical RNC 110 in an exemplary embodiment consistent with the present invention. The RNC 110 comprises a number of functional blocks that communicate with each other as necessary to perform their designated functional roles. The blocks illustrated in FIG. 3 may be implemented in a variety of hardware, both analog and digital, and software aspects, known to those skilled in the art. Asynchronous Transfer Module (ATM) 340 interfaces the RNC 110 with the CN in ATM mode over the Iu interface and with the NodeB in ATM mode over the Iub interface.

The Radio Network Management Controller (RNM) 310 controls signaling to the CN and the UE. It may be primarily responsible for establishing the Quality of Service (QOS) factor for each call or session. The Radio Access Bearer Management controller (RAB) 320 is responsible for the establishment and assignment of radio channels in the NodeB and monitoring of Quality of Service data. The Signal Processing controller 330 is responsible for flow control and retransmission of data between the ATM and the UE and CN.

Figure 4:
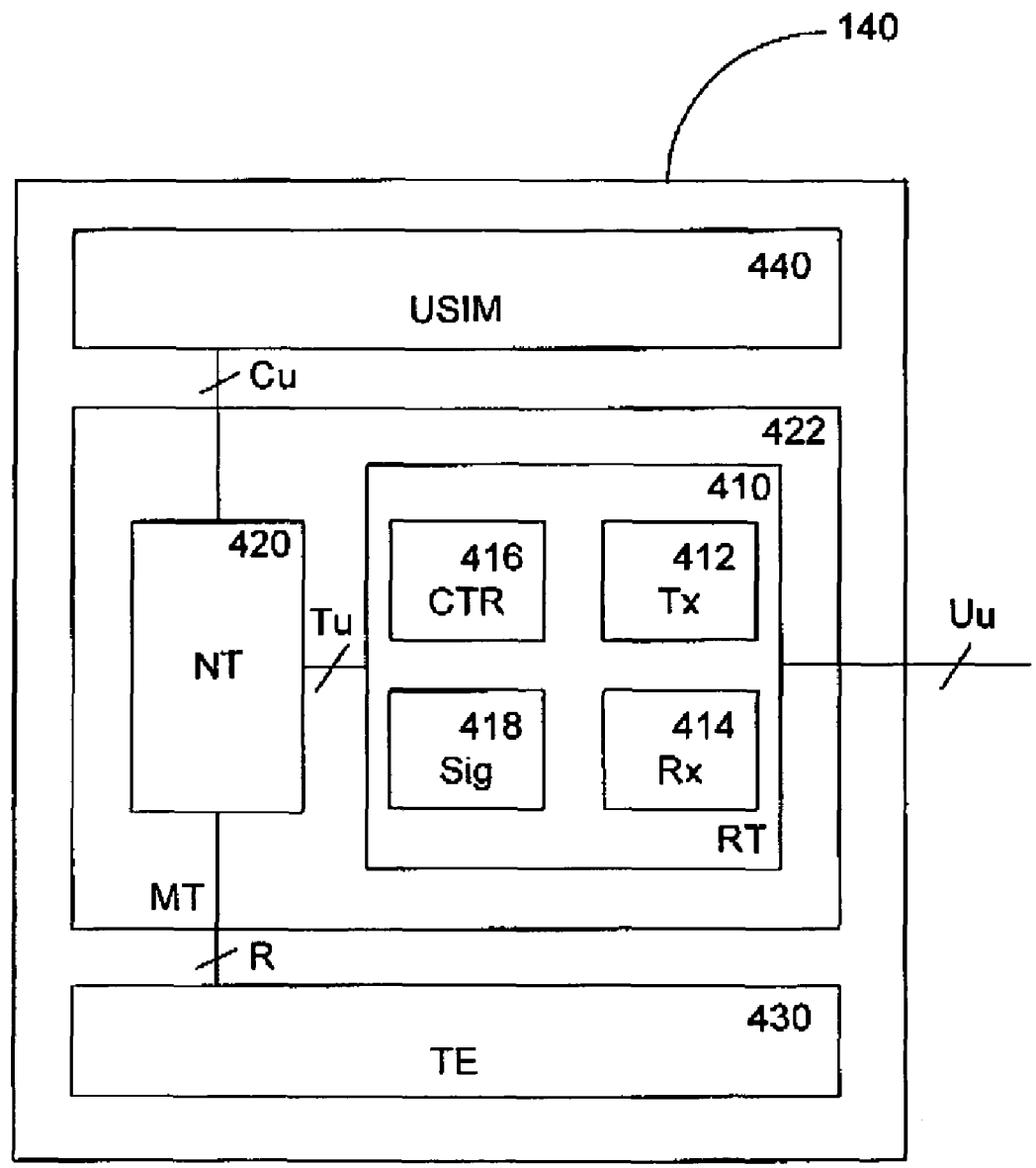
FIG. 4 illustrates a diagram of a typical UE 140 in an exemplary embodiment consistent with the present invention.

FIG. 4 illustrates a diagram of a typical UE 140 in an exemplary embodiment consistent with the present invention. The UE 140 comprises a number of functional blocks that communicate with each other as necessary to perform their designated functional roles. The blocks illustrated in FIG. 4 may be implemented in a variety of hardware, both analog and digital, and software aspects, known to those skilled in the art. The UE 140 comprises a Mobile Termination (MT) 422, Terminal Equipment (TE) 430, and a Universal Subscriber Identity Module (USIM) 440.

The MT may be comprised of a Radio Termination (RT) 410 and a Network Termination (NT) 420. The RT 410 may be responsible from the physical layer functions, as well as the air interface higher functions, such as MAC, RLC, and RRC. The Transmitter 412 and Receiver 414 communicate over the Uu interface to the NodeB, transmitting signals to and from the controller 416 and signal processor 418. Controller 416 and signal processor 418, comprising an input, processor, and output, may operate in conjunction to perform physical layer functions, for instance, generating the channelization codes and scrambling codes, performing spreading and dispreading operations, and interleaving and deinterleaving. They also may perform the MAC, RLC, and RRC functions.

The RT 410 communicates with the NT 420 across the Tu interface. The NT 420 may be responsible for call management, mobility management, and session management. The NT 420 communicates with the USIM 440 over the Cu interface and with the TE 430 over the R interface. The USIM 440 contains user information about the subscriber who operates the UE. The TE 430 is the interface between the telecommunications platform and applications residing on the UE or an externally interfaced device.

As previously discussed the NodeB is responsible for Physical Layer communication to the UE, with the Signal Processor operating in conjunction with the Transmitter and the Receiver. While in the UE, the Radio Termination is responsible for the Physical Layer functions, with the Signal processor of the RT operating in conjunction with the Transmitter and Receiver. Because the operation of the Physical Layer functions may be common and symmetrical between both units signal processors, transmitters and receivers, the operation of the physical layer that will apply to both units will be commonly discussed.

Figure 5:
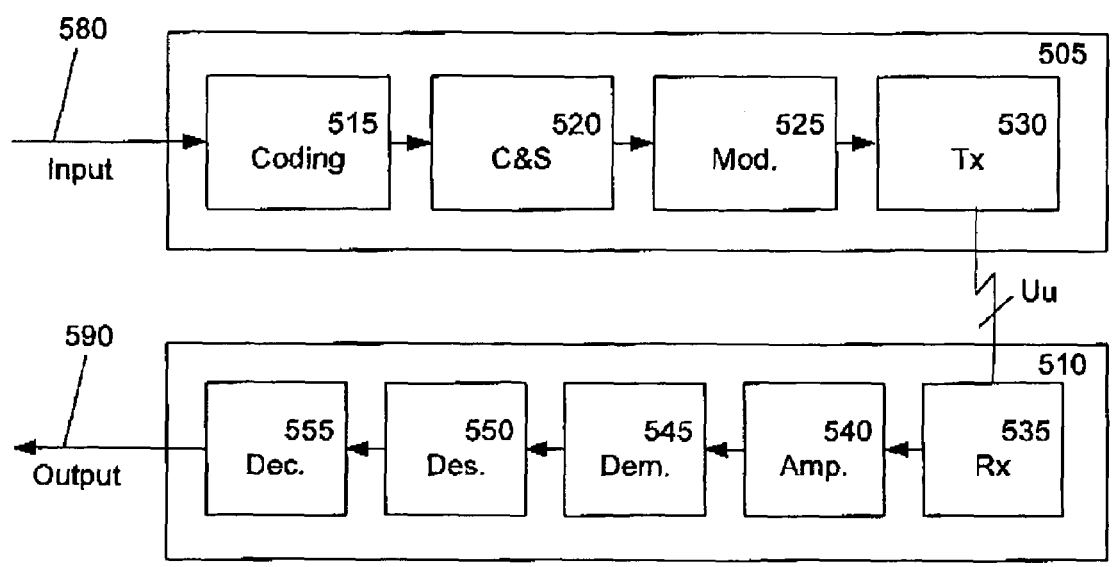
FIG. 5 illustrates a block diagram of a Physical Layer transmit chain and a Physical Layer receiver chain in an exemplary embodiment consistent with the present invention.

FIG. 5 illustrates a block diagram of a Physical Layer transmit chain 505 and a Physical Layer receiver chain 510 in an exemplary embodiment consistent with the present invention. Input data stream 580 is delivered to the transmit chain 505 in transport blocks at a predefined rate corresponding to a Transmission Time Interval (TTI). The TTI value typically depends on the type of data to be transmitted, e.g., signaling data, user data. The TTI may be set to 10, 20, 40, or 80 ms and is a multiple of the radio frame length (10 ms.), so that each transport block is mapped over an even number of radio frames. For speech service, for example, the transport blocks may be delivered with a 20 ms TTI.

At coding block 515, the input data stream 580 comprising transport blocks may be coded, interleaved, and reformatted to fit a number of radio frames corresponding to the TTI. As discussed above, each radio frame comprises a predefined number of slots, each of which is able to carry a number of information bits. In the UMTS standard, for example, each radio frame comprises 15 slots, with each slot carrying 2560 chips.

At spreading block 520, the coded data stream from coding block 515 is channelized and spread. In a downlink channel, a channelization code is used in spreading that identifies the User Equipment to which the data is being sent. In an uplink channel, a channelization code is used in spreading that identifies a Transport Channel. The data may be further coded by a pseudo-random sequence that identifies the cell of the base station, or NodeB, in the downlink channel and the User Equipment in the uplink channel. In order to enhance communication, downlink channelization codes may be selected among a set of Orthogonal Variable Spreading Factor codes (OVSF codes). Those skilled in the art will appreciate that orthogonal codes generate zero cross-correlation to enhance separation of channels by the receiver of the transmitted signal.

At modulation block 525, the spread data stream from block 520 is modulated. For example, in UMTS Quadrature Phase Shift Keying modulation (QPSK) is utilized in the downlink transmitters and Offset Quadrature Phase Shift Keying modulation (OQPSK) is used in the uplink transmitters, with the resulting modulated signal filtered to fit an appropriate spectrum mask. The spectrum mask will vary depending on the specific Reduced Rate option selected. For instance, in ¼ rate UTRAN, the bandwidth is reduced from 5 MHz to 1.25 MHz, so there may be a corresponding change in the filter parameter to meet the appropriate narrower spectrum mask.

At transmitter block 530, the modulated signal is transposed to a higher frequency, amplified and sent over an air interface as the over the air signal to the remote end receiver or User Equipment.

The over the air signal is received over the air interface by the receiver chain 510. Receiver 535 passes the signal to amplifier 540 where the signal is amplified, filtered and down-converted to a central frequency where it is sampled and converted from the analog to the digital domain. The filter in amplifier block 540 may have variable parameters such that the bandwidth of the filter will change depending upon the Reduced Rate option being utilized. For instance, in a ½ rate UTRAN application, the filter may filter a 2.5 MHz band, rather than the 5 MHz band utilized in Full Rate UTRAN.

The digital signal from amplifier 540 is sent to demodulator 545 where the signal is demodulated. At de-spreading block 550, the demodulated signal is de-spread using the pseudo-random sequence and channelization codes with which the signal was originally spread.

At decoding block 555, the de-spread signal is received from the de-spreading block 550 and the signal is de-interleaved and decoded. The decoded data stream leaves the receive chain 555 as an output data stream 590 for further processing at higher layers within the UMTS.

Figure 6:
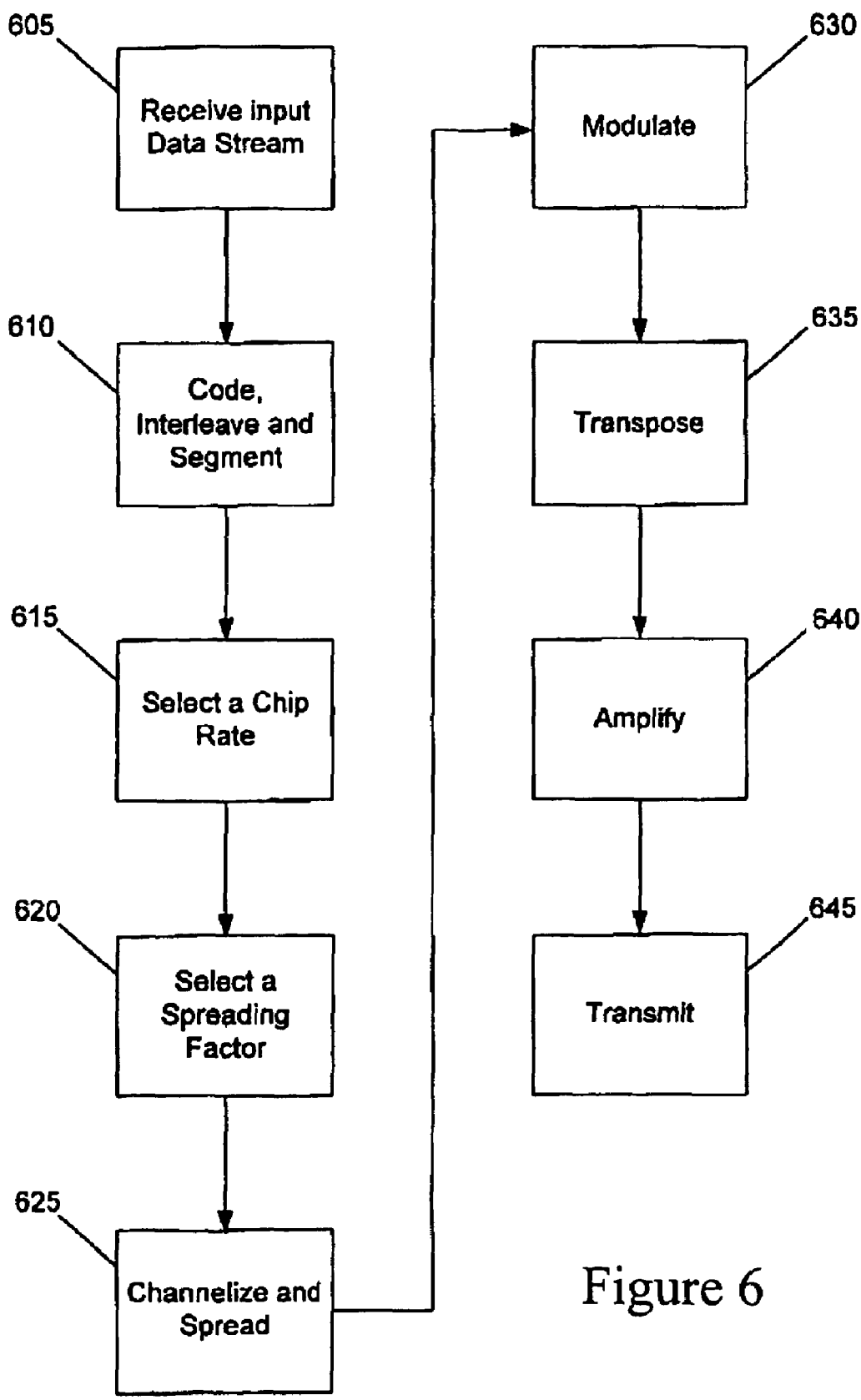
FIG. 6 illustrates a flow chart of the transmit chain in an exemplary embodiment of the present invention.

FIG. 6 illustrates a flow chart of the transmit chain 505 in an exemplary embodiment of the present invention. At stage 605, the input data stream is received in the signal processor. At stage 610, the input data stream may be coded, interleaved, and segmented to fit into radio frames. At stage 615, the signal processor selects an operating chip rate from one or more chip rates. The base station, or NodeB, will be selecting a downlink chip rate; the handset, or UE, will be selecting an uplink chip rate. At stage 620, depending on the QOS selected or negotiated between the communicating units, the signal processor selects the spreading factor. At stage 625, the coded data stream is spread by a code dependent upon the spreading factor.

At stage 630, the spread data stream is modulated. The modulated data stream is transposed and amplified in stages 635 and 640, respectively, prior to being transmitted over the air interface at stage 645.

Figure 7:
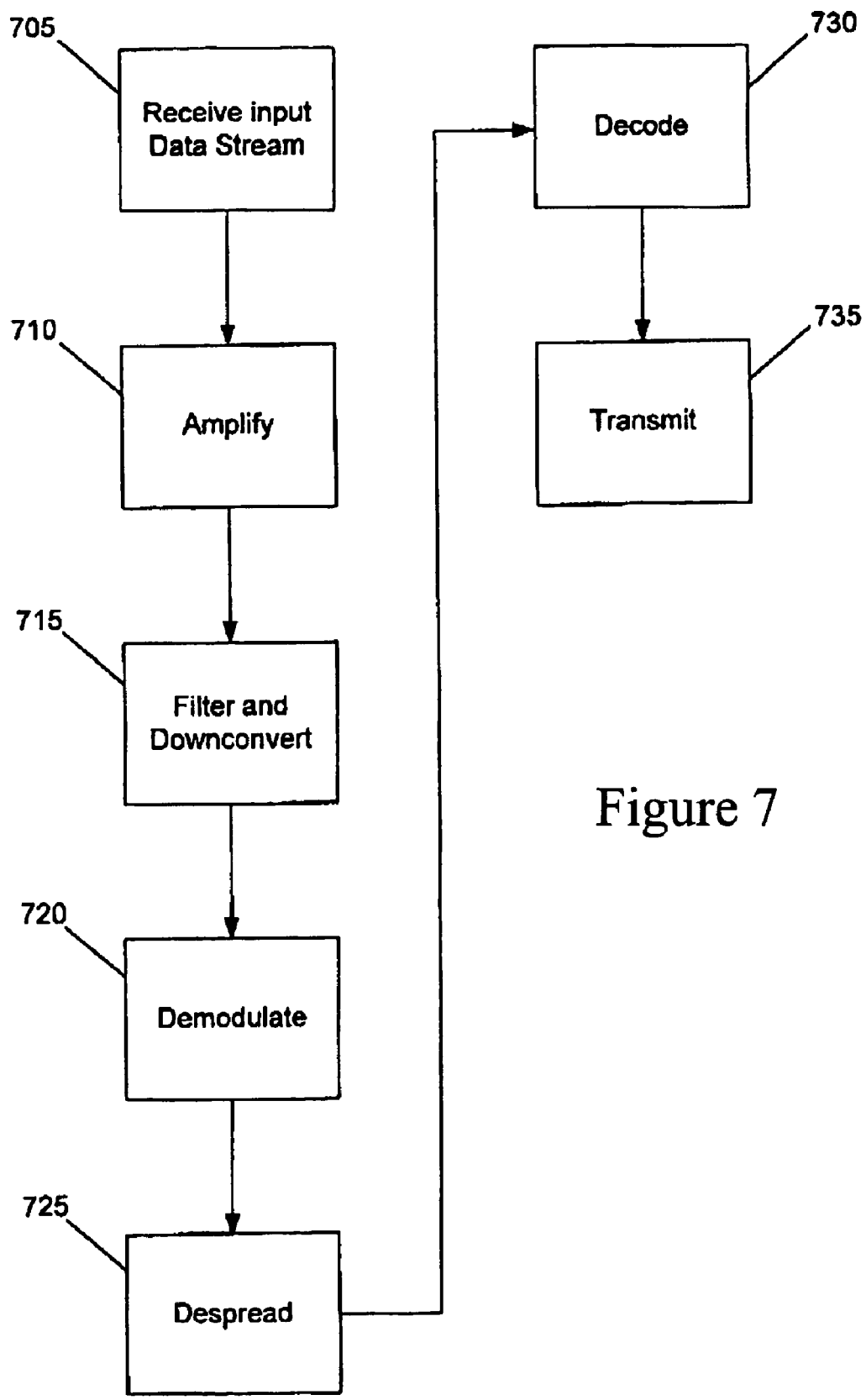
FIG. 7 illustrates a flow chart of the receive chain in an exemplary embodiment of the present invention.

FIG. 7 illustrates a flow chart of the receive chain 510 in an exemplary embodiment of the present invention. At stage 705, a spread data stream is received at the receiver. At stage 710, the signal is amplified, and then filtered and downconverted in stage 715. At stage 720, the signal is demodulated. At stage 725, the spread signal is despread and passed to stage 730 for decoding. At stage 735, the decoded data stream is transmitted to higher layers within the system.

Communications between the NodeB and the User Equipment takes place over the airwaves across the Uu interface. Communication is at a particular frequency, or two frequencies over channels operating in FDD where an uplink channel is operating at $f_1$ and a downlink channel is operating at $f_2$. The communication is over a specific bandwidth, 5 MHz in Full Rate UTRAN and less in Reduced Rate UTRAN. In addition, the communication will be at a particular operating chip rate and spreading factor, both of which may vary in Reduced Rate UTRAN.

In Full Rate UTRAN, the operating chip rate is always 3.84 Mchips/second, but in Reduced Rate UTRAN, which is an embodiment of this invention, the operating chip rate is variable and may need to be established at some point in the RNS and in the UE. The operating chip rate may vary between a downlink operating chip rate and an uplink operating chip rate, where downlink refers to communications from the NodeB and uplink refers to communication from the UE. The downlink operating chip rate may be transferred from the RNC to the NodeB, or the downlink operating chip rate may be set in the NodeB. The uplink operating chip rate may be established by the MT or communicated to the MT by the TE.

The spreading factor may be set in the NodeB based on quality of service data sent to the NodeB or the spreading factor may be more directly sent to the NodeB from the RNC in the system. The spreading factor utilized by the UE may be based upon the QOS as set by the RNS or based upon a setting established by the TE within the UE. The QOS, and thus the spreading factor, may need to be negotiated between the UE and the RNS.

The mathematical basis of the present invention will now be described in relationship to the downlink chip rate according to an exemplary embodiment of the present invention. A similar analysis will later be presented for an uplink chip rate calculation. The downlink chip rate, $R_C$, defined in the UMTS standard to be 3.84 Mchips/second, can be generated by the following formula:

$$R_C = \frac{N_S N_C}{T_F} \qquad \text{(Formula 1)}$$

where:

$N_S$ is the number of slots per radio frame (15 in the standard);

$N_C$ is the number of chips per slot (2560 in the standard); and $T_F$ is the radio frame duration (10 ms in the standard).

The downlink number of chips per slot may also be mathematically expressed as a function of the spreading factor, as shown in the following formula:

$$N_C = 10 \times 2^k \times \frac{SF}{2} \qquad \text{(Formula 2)}$$

where:

k=0 . . . 7; and $$SF\text{(range of downlink spreading factors in a UTRAN system)} = \frac{512}{2^k}. \qquad \text{(Formula 3)}$$

The number of transmitted data bits per downlink slot is equal to $10 \times 2^k$, including both signaling and user bits.

Thus, according to the UMTS standards, the downlink spreading factor may be established between 4 and 512. The spreading factor is usually determined for each service type by upper layers of the UTRAN based on quality of service, and possibly, data transmission rate requirements. A larger spreading factor reduces the number of data bits that can be transmitted. For example, a spreading factor of 256, meaning that there are 256 chips transmitted for each bit of incoming data, would result in a downlink data transfer rate of 20 bits per slot or 30 kbit/second. In contrast, a spreading factor of 4 would result in a data transfer rate of 1280 bits per slot or 1.92 Mbit/second.

In order to create a reduced and flexible rate system, such as Reduced Rate UTRAN, that utilizes a reduced and variable bandwidth, a system is established to support a reduced bandwidth to yield a reduced rate system which operates at fractions of the full rate. This system will continue to be described in an exemplary embodiment of a Reduced Rate UTRAN system which has a full rate bandwidth of 5 MHz and a full rate chip rate of 3.84 Mchips/second. The Reduced Rate UTRAN system will be described which provides for rates that are a fraction of the full rate system.

In an exemplary embodiment of the present invention, the chip rate is reduced while maintaining the radio frame length (10 ms) and slot structure of the present UMTS standard. As described in the following formulas, the chip rate will be reduced by varying the number of slots and the number of chips per slot in the Reduced Rate UTRAN system. By reducing the chip, the required bandwidth of the uplink and downlink channels is proportionally reduced.

In the Reduced Rate UTRAN system, the downlink chip rate, $R_C^R$, can be generated by the following formula:

$$R_C^R = R_C \times \frac{n}{p} \quad \text{(Formula 4)}$$

where:

n/p is the reduced rate ratio of the reduced rate system.

This can be further represented by, the following expansion of the above formula to:

$$R_C^R = \frac{N_S N_C}{T_F} \times \frac{n}{p} = \frac{N_S^R N_C^R}{T_F} \times \frac{n}{p} \quad \text{(Formula 5)}$$

where:

$N_S^R$ is the number of slots per radio frame in the reduced rate system; and $N_C^R$ is the number of chips per slot in the reduced rate system.

The number of downlink chips per slot in the reduced rate system may also be mathematically expressed as a function of the spreading factor, as shown in the following formula:

$$N_C^R = 10 \times 2^q \times \frac{SF^R}{2} \quad \text{(Formula 6)}$$

where:

$SF^R$ is the spreading factor range in a reduced rate system and the number of bits per slot is equal to $10 \times 2^q$.

In order to assist in maintaining greater compatibility with the UMTS standard, the number of slots per radio frame and the range of downlink spreading factors are obtained by the following formula to achieve exemplary n/p ratios of 1/2, 1/3, 1/4, 2/5, and 1/5:

where i=1, 2 n=1 ... i $$q = 0 \ldots (7-i+n-1) \quad \text{(Formula 7)}$$

$$\text{if } p = 2^i, N_S^R = N_S \text{ and } SF^R = n \times \frac{512}{2^{q+i}} \quad \text{(Formula 8)}$$

$$\text{if } p = 2^i + 1, N_S^R = N_S \times \frac{2^i}{p} \text{ and } SF^R = n \times \frac{512}{2^{q+i}} \quad \text{(Formula 9)}$$

Applying these formulas to some exemplary ranges of n and p yields the following Table 1:

TABLE 1a

| i | p | n | Reduced Rate Ratio | $T_F$ (ms) | $N_S^R$ | Range of Spreading Factors | $R_C^R$ (Mchips/s) |
|---|---|---|---|---|---|---|---|
| i = 1 >> p = $2^i$ | 2 | 1 | ½ | 10 | 15 | 4–256 | 1.92 |
| i = 1 >> p = $2^i$ + 1 | 3 | 1 | ⅓ | 10 | 10 | 4–256 | 1.28 |
| i = 2 >> p = $2^i$ | 4 | 1 | ¼ | 10 | 15 | 4–128 | .960 |
| i = 2 >> p = $2^i$ | 4 | 2 | ½ | 10 | 15 | 4–256 | 1.92 |
| i = 2 >> p = $2^i$ + 1 | 5 | 1 | ⅕ | 10 | 12 | 4–128 | .768 |
| i = 2 >> p = $2^i$ + 1 | 5 | 2 | ⅖ | 10 | 12 | 4–256 | 1.536 |

For example, if a ½ Reduced Rate UTRAN system is desired, the formulas above would start with n=1 and p=2. Because p=$2^i$, with i=1, Formula 8 states that $N_S^R = N_S$, so that the number of slots would be 15. Formula 7 yields q having a possible value between 0 and 6, such that the spreading factor can be between 4 and 256. Arbitrarily electing a spreading factor of 4 for illustrative purposes, yields a q value of 6. Inserting these values into Formula 6, yields a chip rate of 1.92 Mchips/second. This chip rate for the ½ Reduced Rate UTRAN is independent of the spreading factor utilized in the equations.

Thus, the above mathematical framework provides a basis for reducing the chip rate in any form of reduced rate system, and more specifically for an exemplary embodiment of a Reduced Rate UTRAN system consistent with the principles of the present invention. Depending on the choices of n and p, an exemplary embodiment of the invention can generate reduced chip rates resulting in consequently reduced bandwidth requirements. For instance, a reduced rate ratio of 1/2 reduces the bandwidth requirement from 5 MHz per channel to less than 2.5 MHz per channel. Because of the above mathematical relationships, chip rates may be flexibly implemented allowing chip rate changes to be made in uplink and downlink channels with minimal implementation costs.

The previous mathematical basis of the present invention may also be described in relation to the uplink chip rate according to an exemplary embodiment of the present invention. In that case, the uplink chip rate, $R_C$, defined in the UMTS standard to be 3.84 Mchips/second, can be generated by the following formula:

$$R_C = \frac{N_S N_C}{T_v} \quad \text{(Formula 10)}$$

where:
$N_S$ is the number of slots per radio frame;
$N_C$ is the number of chips per slot; and
$T_F$ is the radio frame duration.

The uplink number of chips per slot may also be mathematically expressed as a function of the spreading factor, as shown in the following formula:

$$N_C = 10 \times 2^k \times SF \quad \text{(Formula 11)}$$

where:
k=0 . . . 6; and $$SF(\text{range of uplink spreading factors in a UTRAN system}) = \frac{256}{2^k}. \quad \text{(Formula 12)}$$

The number of transmitted data bits per uplink slot is equal to $10 \times 2^k$ which includes only user bits.

In the Reduced Rate UTRAN system, the uplink chip rate, $R_C^R$, can be generated by the following formula:

$$R_C^R = R_C \times \frac{n}{p} \quad \text{(Formula 13)}$$

where:
n/p is the reduced rate ratio of the reduced rate system.
This can be further represented by, the following expansion of the above formula to:

$$R_C^R = \frac{N_S N_C}{T_F} \times \frac{n}{p} = \frac{N_S^R N_C^R}{T_F} \quad \text{(Formula 14)}$$

where:
$N_S^R$ is the number of slots per radio frame in the reduced rate system; and
$N_C^R$ is the number of chips per slot in the reduced rate system.

The number of uplink chips per slot in the reduced rate system may also be mathematically expressed as a function of the spreading factor, as shown in the following formula:

$$N_C^R = 10 \times 2^q \times SF^R \quad \text{(Formula 15)}$$

where:
$SF^R$ is the spreading factor range in a reduced rate system and the number of bits per slot is equal to $10 \times 2^q$.

The range of uplink spreading factors are obtained by the following formula to achieve exemplary n/p ratios of 1/2, 1/3, 1/4, 2/5, and 1/5:
where
i=1, 2
n=1. . . i $$q=0. . . (6-i+n-1) \quad \text{(Formula 16)}$$

if $p = 2^i$, $N_S^R = N_S$ and $SF^R = n \times \frac{256}{2^{q+i}}$ (Formula 17)

if $p = 2^i + 1$, $N_S^R = N_S \times \frac{2^i}{p}$ and $SF^R = n \times \frac{256}{2^{q+i}}$ (Formula 18)

Applying these formulas to some exemplary ranges of n and p yields the following Table 1:

TABLE 1b

| i | p | n | Reduced Rate Ratio | $T_F$ (ms) | $N_S^R$ | Range of Spreading Factors | $R_C^R$ (Mchips/s) |
|---|---|---|---|---|---|---|---|
| i = 1 >> p = $2^i$ | 2 | 1 | ½ | 10 | 15 | 4–128 | 1.92 |
| i = 1 >> p = $2^i$ + 1 | 3 | 1 | ⅓ | 10 | 10 | 4–128 | 1.28 |
| i = 2 >> p = $2^i$ | 4 | 1 | ¼ | 10 | 15 | 4–64 | .960 |
| i = 2 >> p = $2^i$ | 4 | 2 | ½ | 10 | 15 | 4–128 | 1.92 |
| i = 2 >> p = $2^i$ + 1 | 5 | 1 | ⅕ | 10 | 12 | 4–64 | .768 |
| i = 2 >> p = $2^i$ + 1 | 5 | 2 | ⅖ | 10 | 12 | 4–128 | 1.536 |

Depending on the QOS, or frame type, various communication rates can be established. A common table built according to current Full Rate UMTS illustrates the various uplink bit rates achieved based on the frame type. This Full Rate UTRAN table is illustrated below as Table 2a:

TABLE 2a

| Frame Type | Bits/Slot | Spreading Factor | Bits/Frame | Data Rate (kbit/s) |
|---|---|---|---|---|
| 0 | 10 | 256 | 150 | 15 |
| 1 | 20 | 128 | 300 | 30 |
| 2 | 40 | 64 | 600 | 60 |
| 3 | 80 | 32 | 1200 | 120 |
| 4 | 160 | 16 | 2400 | 240 |
| 5 | 320 | 8 | 4800 | 480 |
| 6 | 640 | 4 | 9600 | 960 |

Table 2a shows, for instance, that a frame type of 2, in a Full Rate UTRAN application, will yield 40 bits/slot, with a spreading factor of 64, 600 bits/frame, and a data rate of 60 kbit/s.

A modification of this table can be generated for reduced rate 3G systems, such as the exemplary Reduced Rate UTRAN system, consistent with the principles of the present invention. The following table is generated for Reduced Rate UTRAN Uplink Frames and a similar table may be generated for Reduced Rate UTRAN Downlink Frames. The table is generated using the formulas previously given. This Reduced Rate UTRAN table is illustrated below as Table 2b.

TABLE 2b

| | ½ Reduced Rate | | | |
|---|---|---|---|---|
| Frame Type | Bits/Slot | Spreading Factor | Bits/Frame | Data Rate (kbit/s) |
| 0 | 10 | 128 | 150 | 15 |
| 1 | 20 | 64 | 300 | 30 |
| 2 | 40 | 32 | 600 | 60 |
| 3 | 80 | 16 | 1200 | 120 |
| 4 | 160 | 8 | 2400 | 240 |
| 5 | 320 | 4 | 4800 | 480 |
| | ⅖ Reduced Rate | | | |
| Frame Type | Bits/Slot | Spreading Factor | Bits/Frame | Data Rate (kbit/s) |
| 0 | 10 | 128 | 120 | 12 |
| 1 | 20 | 64 | 240 | 24 |
| 2 | 40 | 32 | 480 | 48 |
| 3 | 80 | 16 | 960 | 96 |

TABLE 2b-continued

| Frame Type | Bits/Slot | Spreading Factor | Bits/Frame | Data Rate (kbit/s) |
|---|---|---|---|---|
| 4 | 160 | 8 | 1920 | 192 |
| 5 | 320 | 4 | 3840 | 384 |

⅓ Reduced Rate

| Frame Type | Bits/Slot | Spreading Factor | Bits/Frame | Data Rate (kbit/s) |
|---|---|---|---|---|
| 0 | 10 | 128 | 100 | 10 |
| 1 | 20 | 64 | 200 | 20 |
| 2 | 40 | 32 | 400 | 40 |
| 3 | 80 | 16 | 800 | 80 |
| 4 | 160 | 8 | 1600 | 160 |
| 5 | 320 | 4 | 3200 | 320 |

¼ Reduced Rate

| Frame Type | Bits/Slot | Spreading Factor | Bits/Frame | Data Rate (kbit/s) |
|---|---|---|---|---|
| 0 | 10 | 64 | 150 | 15 |
| 1 | 20 | 32 | 300 | 30 |
| 2 | 40 | 16 | 600 | 60 |
| 3 | 80 | 8 | 1200 | 120 |
| 4 | 160 | 4 | 2400 | 240 |

⅕ Reduced Rate

| Frame Type | Bits/Slot | Spreading Factor | Bits/Frame | Data Rate (kbit/s) |
|---|---|---|---|---|
| 0 | 10 | 64 | 120 | 12 |
| 1 | 20 | 32 | 240 | 24 |
| 2 | 40 | 16 | 480 | 48 |
| 3 | 80 | 8 | 960 | 96 |
| 4 | 160 | 4 | 1920 | 192 |

In exemplary embodiments of the invention, the bits per slot remain constants regardless of the Reduced Rate UTRAN selected. The only changes made are the number of bits/frame, depending on the number of slots generated, the associated data rate, and the spreading factor utilized. The above rates are exemplary only and other rates could also be generated.

Figure 8A:
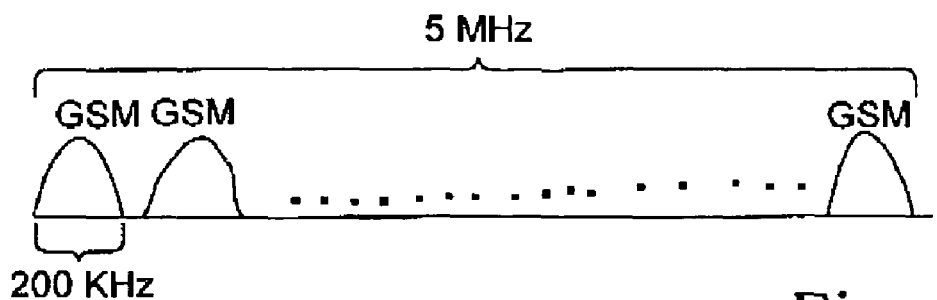
FIGS. 8a through 8d illustrate a migration path from a 2G system operating with 200 kHz channels to a full rate 3G system operating with 5 MHz channels in an exemplary embodiment of the present invention.

Such a system for providing flexible data rate transmissions provides for a migration path from existing 2G systems to 3G systems. FIGS. 8a through 8d illustrate a migration path from a 2G system operating with 200 kHz channels to a full rate 3G system operating with 5 MHz channels in an exemplary embodiment of the present invention. FIG. 8a illustrates a 5 MHz spectrum allocation containing a plurality of 200 kHz network provider frequencies. In this 2G system, only 200 kHz network provider frequencies are present.

Figure 8B:
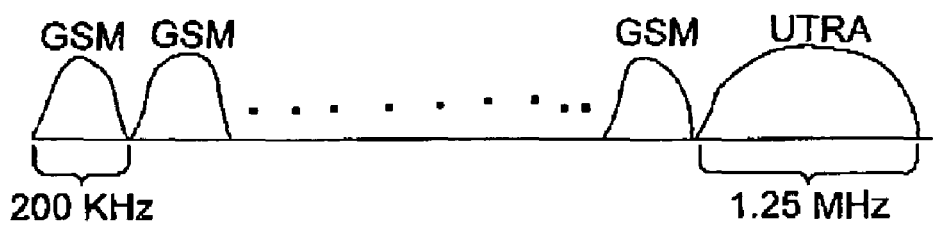

As a service provider begins the migration to a full rate system that requires a larger channel bandwidth, FIG. 8b illustrates allocating a portion of the 5 MHz spectrum allocation to a 1.25 MHz ¼ rate 3G system. The remainder of the spectrum remains allocated to 200 kHz network channels. By selection n=1 and p=4, the ¼ rate, the 3G system provides for a chip rate of 960 kChips/second. In this initial migration mode, the 2G system and 3G system share the 5 MHz frequency spectrum. As the user equipment enters a cell site, or is initially powered on, during the synchronization phase, the user equipment will learn through the synchronization channel (SCH), generated by the NodeB in the cell, the chip rate with which the cell is operating, e.g., the ¼ rate operation, of the 3G system. Because each time a UE must find a SCH, entering a cell cite or power up for example, the UE will always be apprised of the current chip rate of the cell site. In this way, the system can migrate from one reduced rate to another reduced rate or full rate without undo difficulty.

Figure 8C:
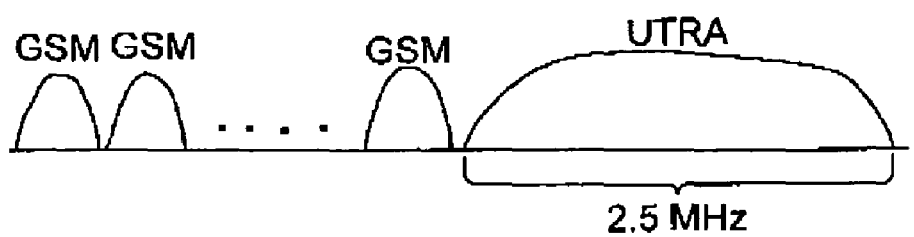

In FIG. 8c, as more users migrate to the 3G system from the 2G system, the service provider may reduce the number of 200 kHz GSM channels and increase the bandwidth of the 3G system to 2.5 MHz with a ½ rate 3G system. By selecting n=1 and p=2, a 3G system is established with a chip rate of 1.92 Mchips/second. In addition, the number of slots is set at 15 slots by the above formulas. The remaining bandwidth is used by 200 kHz 2G network providers.

Figure 8D:
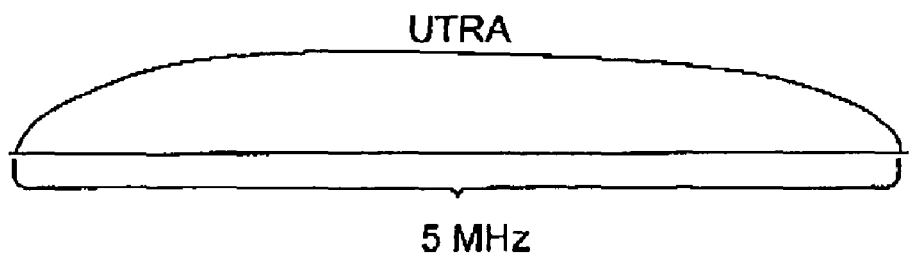

In FIG. 8d, as all users are migrated to 3G systems or support for 3G is disabled, the entire 5 MHz bandwidth is allocated to the 3G system. By selecting n=1 and p=1, the 3G system is established at full rate with communication of 3.84 Mchips/second.

While a migration path is disclosed from a 2G system through a Reduced Rate 3G system to a full rate 3G system, it is also contemplated that this invention may be used on a less transient basis to establish Reduced Rate 3G systems where a service provider may have no intention of ever migrating to full rate 3G. Business and/or governmental consideration may make the implementation of a full rate UTRAN system less ideal than a reduced rate system.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A base station far providing flexible data rate transmission in a telecommunications system comprising:
    an interface operable to receive an incoming data stream;
    a signal processor coupled to the interface, the signal processor operable to:
        receive the incoming data stream from the interface;
        select an operating downlink chip rate from at least two chip rates, wherein the first of the two chip rates is equal to a fraction n/p, of the second of the chip rates where n/p is selected from ½, ⅖, ⅓, ¼, and ⅕;
        select a spreading factor;
        spread the incoming data stream into a spread data stream with a channelization code;
        segment the incoming data stream into one or more frames, each frame comprising one or more slots;
        set the number of slots within the frame to 15, if n/p is equal to ½ or ¼;
        set the number of slots within the frame to 10, if n/p is equal to ⅓; and
        set the number of slots to 12, if n/p is equal to ⅕ or ⅖, and
    a transmitter coupled to the signal processor, the transmitter operable to receive the spread data stream from the signal processor and transmit the spread data stream over an air interface.

2. The base station of claim 1, wherein the at least two chip rates are 3.84 Mchips/second and 3.84×(n/p) Mchips/second.

3. The base station of claim 1, wherein the signal processor is further operable to: select the spreading factor based on a quality of service, q, and the operating downlink chip rate.

4. The base station of claim 1, wherein the signal processor is further operable to generate a synchronization signal at the selected operating downlink chip rate, and the transmitter is further operable to transmit the synchronization signal.

5. The base station of claim 1, further comprising: a receiver coupled to the signal processor, the receiver operable to receive a second spread data stream from the air interface which has been transmitted at an operating uplink chip rate selected from one of the at least two chip rates.

6. A base station for providing flexible data rate transmission in a telecommunications system comprising:
   an interface operable to receive an incoming data stream;
   a signal processor coupled to the interface, the signal processor operable to:
      receive the incoming data stream from the interface;
      select an operating downlink chip rate from at least two chip rates;
      select a spreading factor; and
      spread the incoming data stream into a spread data stream with a channelization code; and
   a transmitter coupled to the signal processor, the transmitter operable to receive the spread data stream from the signal processor and transmit the spread data stream over an air interface;
   the signal processor being further operable to:
      where the first of the two chip rates is equal to a fraction, n/p, of the second of the chip rates, and where i=1 to 2, n=1 to i, and q=0 to (7−i+n−1), select the spreading factor, $SF^R$, as $$SF^R = n \times \frac{512}{2^{q+i}}.$$

7. The base station of claim 6, wherein the signal processor is further operable to:
   select a number of slots, $N_S^R$, as:

if $p=2^i$, $N_S^R = N_S$, if $p = 2^i + 1$, $N_S^R = N_S \times \frac{2^i}{p}$ where $N_S$ is a standard number of slots per frame.

8. A base station for providing flexible data rate transmission in a telecommunications system comprising:
   an interface operable to receive an incoming data stream;
   a signal processor coupled to the interface, the signal processor operable to:
      receive the incoming data stream from the interface;
      select an operating downlink chip rate from at least two chip rates, wherein the first of the two chip rates is equal to a fraction, n/p, of the second of the chip rates, where n/p is selected from ½, ⅖, ⅓, ¼, and ⅙;
      spread the incoming data stream into a spread data stream with a channelization code;
      segment the incoming data stream into one or more frames, each frame comprising one or more slots;
      and
      select a spreading factor, $SF^R$, as:

if $n/p = \frac{1}{2}$ or $\frac{1}{4}$, $SF^R = \frac{512}{2^{q+1}}$, if $n/p = \frac{1}{3}, \frac{1}{5}$ or $\frac{2}{5}$, $SF^R = n \times \frac{512}{2^{q+2}}$;

and;
   a transmitter coupled to the signal processor, the transmitter operable to receive the spread data stream from the signal processor and transmit the spread data stream over an air interface, where q is a quality of service.

9. A method of providing flexible data rate transmission in a telecommunication system, comprising:
   receiving an incoming data stream;
   selecting an operating chip rate from at least two chip rates, wherein the first of the chip rates is equal to a fraction, n/p, of the second of the chip rates, where n/p is selected from ½, ⅖, ⅓, ¼, and ⅕;
   selecting a spreading factor;
   spreading the incoming data stream into a spread data stream with a channelization code;
   segmenting the incoming data stream into one or more frames, each frame comprising one or more slots;
   setting the number of slots within the frame to 15, if n/p is equal to ½ or ¼;
   selling the number of slots within the frame to 10, if n/p is equal to ⅓; and
   setting the number of slots to 12, if n/p is equal to ⅕ or ⅖.

10. The method of claim 9, wherein selecting the spreading factor further comprises: selecting the spreading factor based on a quality of service, q, and the operating chip rate.

11. The method of claim 9, further comprising: generating a synchronization signal at the selected operating chip rate and transmitting the synchronization signal.

12. The method of claim 9 further comprising: receiving a second spread data stream from an air interface which has been transmitted at an operating uplink chip rate selected from one of the at least two chip rates.

13. A method of providing flexible data rate transmission in a telecommunication system, comprising:
   receiving an incoming data stream;
   selecting an operating chip rate from at least two chip rates;
   selecting a spreading factor; and
   spreading the incoming data stream into a spread data stream with a channelization code;
   selecting the spreading factor further comprising:
      where the first of the two chip rates is equal to a fraction, n/p, of the second of the chip rates, and where i=1 to 2, n=1 to i, and q=0 to (7−i+n−1), selecting the spreading factor, $SF^R$, as $$SF^R = n \times \frac{512}{2^{q+i}}.$$

14. The method of 13, further comprising selecting a number of slots, $N_S^R$, as:

if $p=2^i$, $N_S^R = N_S$, if $p = 2^i + 1$, $N_S^R = N_S \times \frac{2^i}{p}$, where $N_S$ is a standard number of slots per frame.

15. A method of providing flexible data rate transmission in a telecommunication system, comprising:
receiving an incoming data stream;
selecting an operating chip rate from at least two chip rates, wherein the first of the chip rates is equal to a fraction, n/p of the second of the chip rates, wherein n/p is selected from ½, ⅖, ⅓, ¼, and ⅕;
selecting a spreading factor;
spreading the incoming data stream into a spread data stream with a channelization code;
segmenting the incoming data stream into one or more frames, each frame comprising one or more slots; and
selecting the spreading factor further comprising: setting the spreading factor, $SF^R$, to:

if $n/p = \frac{1}{2}$ or $\frac{1}{4}$, $SF^R = \frac{512}{2^{q+1}}$, or if $n/p = \frac{1}{3}, \frac{1}{5}$ or $\frac{2}{5}$, $SF^R = n \times \frac{512}{2^{q+2}}$, where q is a quality of service.

16. A user equipment for providing flexible data rate transmission in a telecommunications system comprising:
an interface operable to receive an incoming data stream;
a signal processor coupled to the interface, the signal processor operable to:
receive the incoming data stream from the interface;
select an operating uplink chip rate from at least two chip rates, wherein the first of the chip rates is equal to a fraction, n/p, of the second chip rates, where n/p is selected from ½, ⅖, ⅓, ¼, and ⅕;
select a spreading factor;
spread the incoming data stream into a spread data stream with a channelization code;
segment the incoming data stream into one or more frames, each frame comprising one or more slots;
set the number of slots within the frame to 15, if n/p is equal to ½ or ¼;
set the number of slots within the frame to 10, if n/p is equal to ⅓; and
set the number of slots to 12, if n/p is equal to ⅕ or ⅖; and
a transmitter coupled to the signal processor, the transmitter operable to receive the spread data stream from the signal processor and transmit the spread data stream over an air interface.

17. The user equipment of claim 16, wherein the at least two chip rates are 3.84 Mchips/second and 3.84×(n/p) Mchips/second.

18. The user equipment of claim 16, wherein the controller is further operable to:
select the spreading factor based on a quality of service, q, and the operating uplink chip rate.

19. The user equipment of claim 16, further comprising: a receiver coupled to the signal processor, the receiver operable to receive a second spread data stream from the air interface which has been transmitted at an operating downlink chip rate selected from one of the at least two chip rates.

20. A user equipment for providing flexible data rate transmission in a telecommunications system comprising:
an interface operable to receive an incoming data stream;
a signal processor coupled to the interface, the signal processor operable to:
receive the incoming data stream from the interface;
select an operating uplink chip rate from at least two chip rates;
select a spreading factor; and
spread the incoming data stream into a spread data stream with a channelization code; and
a transmitter coupled to the signal processor, the transmitter operable to receive the spread data stream from the signal processor and transmit the spread data stream over an air interface;
the signal processor being further operable to:
where the first of the two chip rates is equal to a fraction, n/p, of the second of the chip rates, and where i=1 to 2, n=1 to i, and q=0 to (6−i+n−1), select the spreading factor, $SF^R$, as $$SF^R = n \times \frac{256}{2^{q+i}}.$$

21. A computer-readable medium having executable instructions for performing steps that provide flexible data rate transmission in a telecommunication system, the steps comprising:
receiving an incoming data stream;
selecting an operating chip rate from at least two chip rates, wherein the first of the chip rates is equal to a fraction, n/p, of the second of the chip rates, where nip is selected from ½, ⅖, ⅓, ¼, and ⅕;
selecting a spreading factor;
spreading the incoming data stream into a spread data stream with a channelization code;
segmenting the incoming data stream into one or more frames, each frame comprising one or mare slots;
setting the number of slots within the frame to 15, if n/p is equal to ½ or ¼;
setting the number of slots within the frame to 10, if n/p is equal to ⅓; and
setting the number of slats to 12, if n/p is equal to ⅕ or ⅖.

22. The computer-readable medium of claim 21 having further executable instructions for: selecting the spreading factor based on a quality of service, q, and the operating chip rate.

23. The computer-readable medium of claim 21 having further executable instructions for: transmitting a synchronization channel at the selected chip rate.

24. The computer-readable medium of claim 21 having further executable instructions for receiving a second spread data stream from an air interface which has been transmitted at an operating uplink chip rate selected from one of the at least two chip rates.

25. A computer-readable medium having executable instructions for performing steps that provide flexible data rate transmission in a telecommunication system, the steps comprising:

receiving an incoming data stream;
selecting an operating chip rate from at least two chip rates;
selecting a spreading factor;
spreading the incoming data stream into a spread data stream with a channelization code; and
where the first of the two chip rates is equal to a fraction, n/p, of the second of the chip rates, and where i=1 to 2, n=1 to i, and q=0 to (7−i+n−1), selecting the spreading factor, $SF^R$, as $$SF^R = n \times \frac{512}{2^{q+i}}.$$

26. The computer-readable medium of claim 25 having further executable instructions for selecting a number of slots, $N_S^R$, as:

if p=$2^i$, $N_S^R$$N_S$, $$\text{if } p = 2^i + 1, N_S^R = N_S \times \frac{2^i}{p},$$

where $N_S$ is a standard number of slots per frame.

27. A computer-readable medium having executable instructions for performing steps that provide flexible data rate transmission in a telecommunication system, the steps comprising:
receiving an incoming data stream;
selecting an operating chip rate from at least two chip rates, wherein the first of the chip rates is equal to a fraction, n/p, of the second of the chip rates, where n/p is selected from ½, ⅖, ⅓, ¼, and ⅕;
selecting a spreading factor;
spreading the incoming data stream into a spread data stream with a channelization code;
segmenting the incoming data stream into one or more frames, each frame comprising one or more slots;
setting the spreading factor, $SF^R$, to:

$$\text{if } n/p = \frac{1}{2} \text{ or } \frac{1}{4}, SF^R = \frac{512}{2^{q+1}}, \text{ or}$$

$$\text{if } n/p = \frac{1}{3}, \frac{1}{5} \text{ or } \frac{2}{5}, SF^R = n \times \frac{512}{2^{q+2}},$$

where q is a quality of service.

28. A signal processor for providing flexible data rate transmission in a telecommunications system comprising:
an input operable to receive an incoming data stream;
a processor coupled to the input, the processor operable to:
receive the incoming data stream from the input;
select an operating downlink chip rate from at least two chip rates, wherein the first of the two chin rates is equal to a fraction, n/p, of the second of the chip rates, where n/p is selected from ½, ⅖, ⅓, ¼, and ⅕;
select a spreading factor;
spread the incoming data stream into a spread data stream with a channelization code;
segment the incoming data stream into one or more frames, each frame comprising one or more slots;
set the number of slots within the frame to 15, if n/p is equal to ½ or ¼;
set the number of slots within the frame to 10, if n/p is equal to ⅓; and
set the number of slots to 12, if n/p is equal to ⅕ or ⅖; and
an output coupled to the processor, the output operable to receive the spread data stream from the processor.

29. The signal processor station of claim 28, wherein the at least two chip rates are 3.84 Mchips/second and 3.84.times (n/p) Mchips/second.

30. The signal processor of claim 28, wherein the processor is further operable to:
select the spreading factor based on a quality of service, q, and the operating downlink chip rate.

31. The signal processor of claim 28, wherein the processor is further operable to generate a synchronization signal at the selected operating downlink chip rate.

32. A signal processor for providing flexible data rate transmission in a telecommunications system comprising:
an input operable to receive an incoming data stream;
a processor coupled to the input, the processor operable to:
receive the incoming data stream from the input;
select an operating downlink chip rate from at least two chip rates;
select a spreading factor;
spread the incoming data stream into a spread data stream with a channelization code; and
where the first of the two chip rates is equal to a fraction, n/p, of the second of the chip rates, and where i=1 to 2, n=1 to i, and q=0 to (7−i+n−1), select the spreading factor, $SF_R$, as $$SF^R = n \times \frac{512}{2^{q+i}}; \text{ and}$$

an output coupled to the processor, the output operable to receive the spread data stream from the processor.

33. The signal processor of claim 32, wherein the processor is further operable to:
select a number of slots, $N_S^R$, as:

if p=$2^i$, $N_S^R$ =$N_S$, $$\text{if } p = 2^i + 1, N_S^R = N_S \times \frac{2^i}{p},$$

where $N_S$ is a standard number of slots per frame.

34. A signal processor for providing flexible data rate transmission in a telecommunications system comprising:
an input operable to receive an incoming data stream;
a processor coupled to the input, the processor operable to:
receive the incoming data stream from the input;
select an operating downlink chip rate from at least two chip rates, wherein the first of the two chip rates is equal to a fraction, n/p, of the second of the chip rates where n/p is selected from ½, ⅖, ⅓, ¼, and ⅕;
select a spreading factor;
spread the incoming data stream into a spread data stream with a channelization code;

segment the incoming data stream into one or more frames, each frame comprising one or more slots;
select the spreading factor, $SF^R$, as:

if $n/p = \frac{1}{2}$ or $\frac{1}{4}$, $SF^R = \frac{512}{2^{q+1}}$, if $n/p = \frac{1}{3}, \frac{1}{5}$ or $\frac{2}{5}$, $SF^R = n \times \frac{512}{2^{q+2}}$; and an output coupled to the processor, the output operable to receive the spread data stream from the processor,
where q is a quality of service.

35. A signal processor for providing flexible data rate transmission in a telecommunications system comprising:
an input operable to receive an incoming data stream;
a processor coupled to the input, the processor operable to:
receive the incoming data stream from the input;
select an operating downlink chip rate from at least two chip rates;
select a spreading factor;
spread the incoming data stream into a spread data stream with a channelization code; and
where the first of the two chip rates is equal to a fraction, n/p, of the second of the chip rates, and where i=1 to 2, n=1 to i, and q=0 to (6−i+n−1), select the spreading factor, $SF^R$, as $$SF^R = n \times \frac{256}{2^{q+i}}; \text{ and}$$

an output coupled to the processor, the output operable to receive the spread data stream from the processor.

36. The signal processor of claim 35, wherein the processor is further operable to:

select a number of slots, $N_S^R$, as:

if $p=2^i$, $N_S^R = N_S$, if $p = 2^i + 1$, $N_S^R = N_S \times \frac{2^i}{p}$, where $N_S$ is a standard number of slots per frame.

37. A signal processor for providing flexible data rate transmission in a telecommunications system comprising:
an input operable to receive an incoming data stream;
a processor coupled to the input, the processor operable to:
receive the incoming dots stream from the input;
select an operating downlink chip rate from at least two chip rates, wherein the first of the two chip rates is equal to a fraction, n/p, of the second of the chip rates, where n/p is selected from ½, ⅖, ⅓, ¼, and ⅕;
select a spreading factor;
spread the incoming data stream into a spread data stream with a channelization code;
segment the incoming data stream into one or more frames, each frame comprising one or more slots;
select the spreading factor, $SF^R$, as:

if $n/p = \frac{1}{2}$ or $\frac{1}{4}$, $SF^R = \frac{256}{2^{q+1}}$, if $n/p = \frac{1}{3}, \frac{1}{5}$ or $\frac{2}{5}$, $SF^R = n \times \frac{256}{2^{q+2}}$; and an output coupled to the processor, the output operable to receive the spread data stream from the processor,
where q is a quality of service.

* * * * *